United States Patent [19]

Surface

[11] Patent Number: 4,862,634
[45] Date of Patent: Sep. 5, 1989

[54] BAIT CONTAINER

[76] Inventor: Wayne C. Surface, P.O. Box 761, New Castle, Pa. 16103

[21] Appl. No.: 140,645

[22] Filed: Jan. 4, 1988

[51] Int. Cl.[4] .............................................. A01K 97/04
[52] U.S. Cl. ......................................................... 43/55
[58] Field of Search ....................................... 43/55, 56

[56] References Cited

U.S. PATENT DOCUMENTS

| | | | |
|---|---|---|---|
| 2,644,269 | 7/1953 | Ormesher | 43/55 |
| 4,005,577 | 1/1977 | Kelley | 43/55 |
| 4,030,227 | 6/1977 | Oftedahl | 43/55 |

OTHER PUBLICATIONS

Popular Science "Wire Brings Live Bait to Hand", Jul. 1948, p. 209.

Primary Examiner—Gene P. Crosby
Attorney, Agent, or Firm—B. Craig Killough

[57] ABSTRACT

This invention is a container in which bait may be contained, and which may be inverted so as to allow bait and water to enter a portion of the container which is then separated by a porous means from the remainder of the container, so that when the container is returned to its upright position belt is separated into a portion of the container for easy removal from the container.

10 Claims, 2 Drawing Sheets

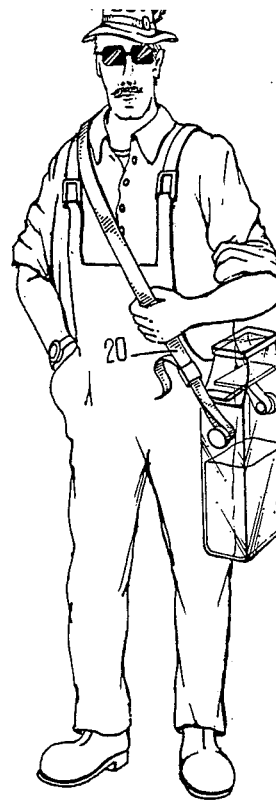
FIG AB
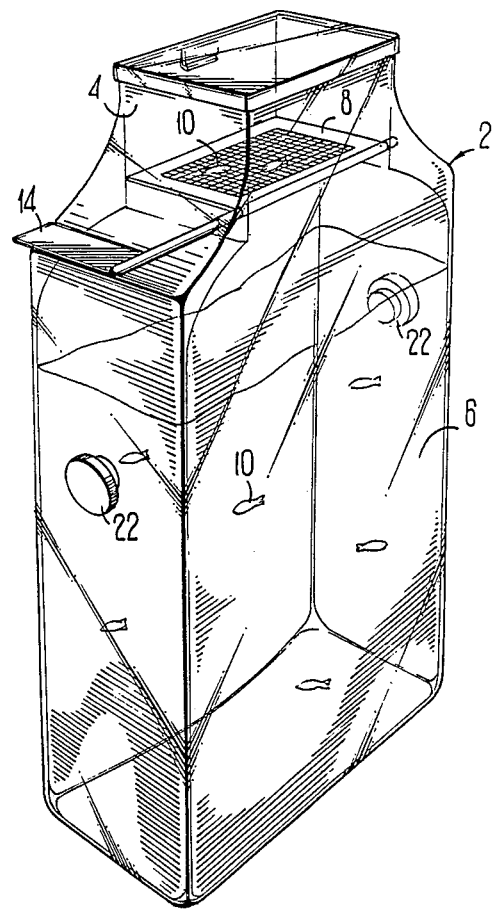
FIG AA

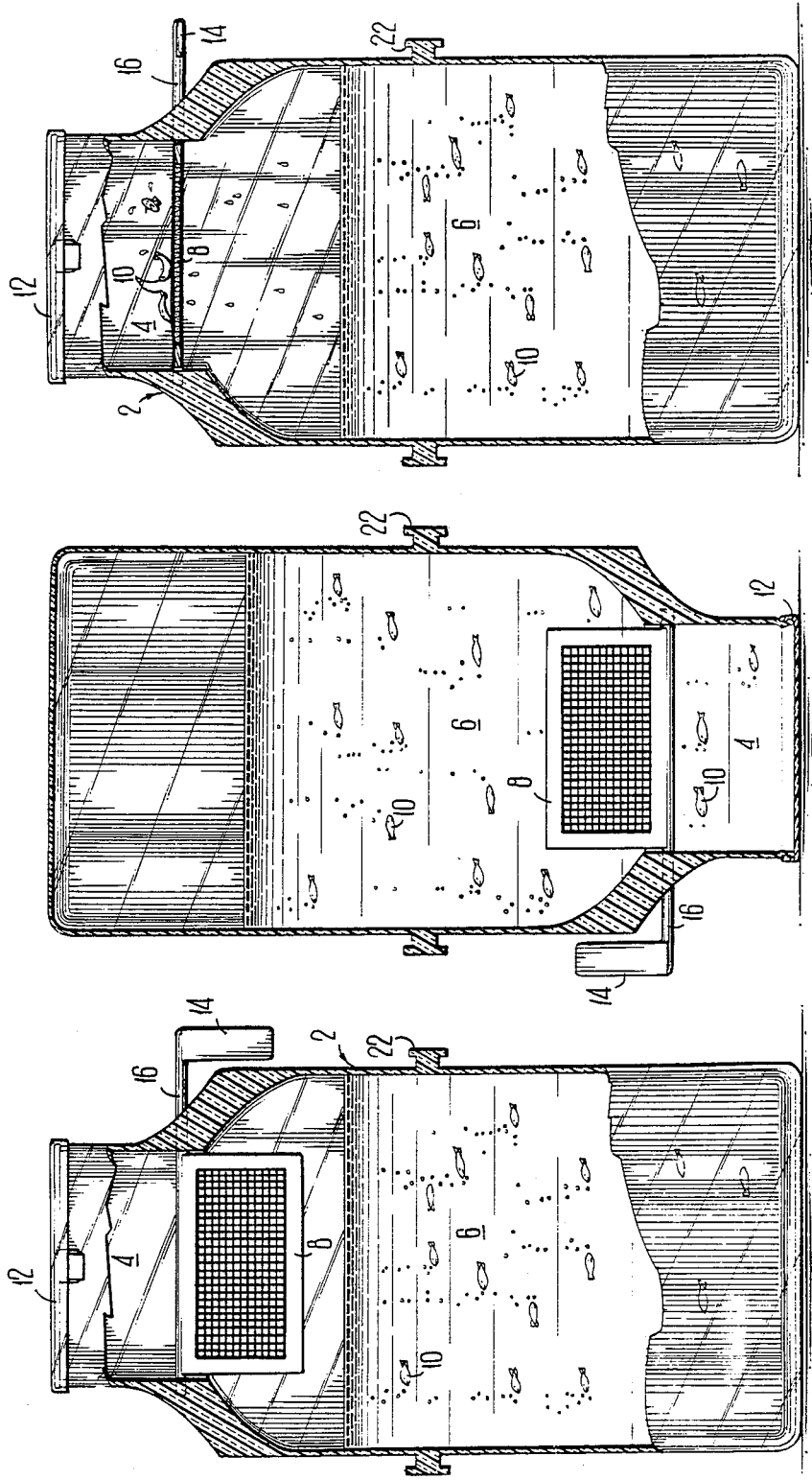

BAIT CONTAINER

BACKGROUND AND SUMMARY OF THE INVENTION

This invention generally relates to containers for holding fishing bait or similar bait, and is more specifically directed to a bait container having a particular means for separating or segregating a portion of the bait contained within the container for easy removal of the bait from the container.

Various containers are found in the prior art which are used for containing live bait and which may be used for fishing or other similar endeavors. These containers may be as simple as a bucket into which bait or bait and water are placed, or the devices may be more elaborate and complicated in their design.

Most bait containers which are used for containing live minnows to be used as fishing bait have in common a means for containing a quantity of water in which minnows are present. The water is used as a life-support means to keep minnows alive until minnows are removed one at a time to be used as bait.

A common difficulty encountered with such containers is the removal of the minnows from the water in the container. The combination of the water and the slippery minnows which are trying to evade capture makes it difficult to remove the minnows from the container.

The present invention provides a container into which water and bait, such as minnows, may be placed. The container has an opening in the top, or upper portion of the container, and the device may be inverted so as to allow water and bait to enter the upper portion. The upper portion may then be separated from the remainder of the container by porous means which allows the water to flow back into the container as the container is placed in its upright position, but retains the bait within the upper portion of the container for easy removal of the bait through the opening in the container.

DESCRIPTION OF THE DRAWINGS

FIG. 1 A shows a perspective view of the bait container, with the bait container containing water and bait.

FIG. 1 B shows the bait container being carried on the shoulder of a person by means of a strap.

FIG. 2 is a side, partially sectioned view of the bait container, with minnows and water contained therein.

FIG. 3 shows a side, partially sectioned view of the device in the inverted position, so as to allow bait and water to enter the upper portion of the bait container.

FIG. 4 is a side, partially sectioned view of the bait container after the container has been returned to its upright position, with bait having been separated or segregated into the upper portion of the bait container.

DETAILED DESCRIPTION OF THE PREFERRED EMBODIMENT

The present invention provides a container into which bait and water may be placed. It is only required that the container be non-porous, so as to contain the water in which bait is present, and that there be an opening in said container of sufficient size through which to place bait, such as live minnows.

In the preferred embodiment, the container 2 is shown as being of a size which may be conveniently worn on the person of the user. FIG. 1 B. The container 2 may be attached to the person, for example, by a strap 20 or belt to the user, and means 22 may be provided therefor. It is also preferred that the container 2 be sufficiently transparent so that the location of the minnows within the container may be observed.

The bait container has an upper portion 4 into which bait and water 6 will enter when the device is inverted as will be seen. The particular shape of the container 2 in the preferred embodiment is tapered in a funnel-like manner to direct the bait and water into the upper portion 4 of the container upon inverting.

The primary feature of the present invention is the porous separating means 8 and its operation. The porous separating means 8 is used to separate the upper portion 4 of the container 2 from the lower portion so as to trap bait 10 within the upper portion 4 for easy removal of the bait 10 through the opening of the container 2, while allowing water to reenter the container 2, leaving only the bait within the upper portion 14.

To use the device, bait 10, such as live minnows, is placed within the container. Also in the container will be water, which is used to keep the minnows alive.

When the user desires to remove a minnow 10 from the container 2, the container 2 is inverted from the position shown in FIG. 2 to the position shown in FIG. 3. It should be noted that the plane of the porous separating means 8 as shown in FIG. 2 is positioned vertically so that the porous separating means 8 does not prohibit the entry of the bait 10 into the upper portion 4 of the container 2. As the container 2 is inverted as shown in FIG. 3, water and minnows enter the upper portion 4 of the container 2. A top or cover 13 which is placed over the container 2 prevents water and minnows from escaping from the container 2 while it is in the inverted position.

As the user observes one or more minnows 10 entering the upper portion 4 of the container 2, manual pressure is applied to the lever means 14 so as to cause the porous separating means 8 to cover the opening to the upper portion 4. The plane of the porous separating means 8 is now in a horizontal position. The container 2 is then returned to its upright position as shown in FIG. 4, with the porous separating means 8 remaining in the horizontal position. The porous characteristic of the porous separating means allows the water which has entered the upper portion upon inverting to return to the lower portion of the bait container as the container is returned to its upright position, but bait 10 which has entered the upper portion 4 is retained within the upper portion 4 of the container 2 by the porous separating means 8. The cover 12 or top of the bait container may now be removed for easy access to the bait 10 which has been retained and separated into the upper portion 4 of the bait container.

The porous separating means 8 need only be any porous material which is capable of actuation so as to separate a portion of the bait container which is located near an opening on the bait container. The porous separating means 8 must be capable of allowing water to flow through it, while retaining bait 10 in the portion of the container which has been separated by the porous separating means 8 from the remainder of the container.

In the preferred embodiment, a plane of screen or mesh is used for the porous separating means. This screen or mesh may be plastic, wire, fabric, or any other screen or mesh material commonly in use. As shown in the drawings, the porous separating means is pivotally attached to the container, with a lever 14 extending to the exterior of the container. This pivotal attachment may simply be a rod 16 which is attached or formed to the porous separating means 8 and extends from the interior of the container 2 to the exterior lever 14. As manual pressure is applied to the lever 14, it causes the porous separating means 8 to rotate so as to cover or uncover the opening to the upper portion 4 of the bait container. In the preferred embodiment, the plane of the porous separating means 8 enters the larger, or lower, portion of the bait container 2 when the plane of the porous separating means 8 is in the vertical position (FIG. 3), so that the porous separating means 8 may be used to aid in scooping minnows into the upper portion 4 of the container 2 as the porous separating means 8 is rotated into the horizontal position.

The present invention provides a bait container which aids in extracting live bait such as minnows from the containers for use in fishing. The present invention may be worn in a canteen fashion about the person of the user, and it is quick and easy to use.

What is claimed is:

1. A bait container, comprising:
   a. a container means into which bait and water may be placed through an opening in an upper portion of said container, so as to contain said bait and said water within said container means;
   b. a porous separating means for selectively separating said bait entering the upper portion of said container means, said porous separating means being pivotally located within the container and capable of actuation by pressure applied to a lever which extends externally from said container means, and wherein said container means is inverted so as to allow bait and water to enter the upper portion of the container means, and the porous separating means is actuated so as to separate said bait and water in said upper portion from a remainder of bait and water in said container, and whereupon placing said container in an upright position will allow said water which was separated into said upper portion to flow through said porous separating means from said upper portion, leaving said bait so separated in said upper portion; and
   c. a removable cover means to cover and seal said opening in said container.

2. A bait container as described in claim 1, wherein said porous separating means comprises a screen mesh through which water is allow to flow, but which prevents bait from flowing there through.

3. A bait container, comprising:
   a. a container means into which bait and water may be placed through an opening in an upper portion of said container, so as to contain said bait and said water within said container means; and
   b. a porous separating means pivotally located within said container which may be actuated so as to separate an upper portion of said container from a lower portion of said container so as to trap bait within said upper portion for removal through said opening.

4. A bait container as described in claim 3, wherein said porous separating means is actuated by an external means attached to said porous separating means.

5. A bait container as described in claim 4, wherein said external means is a lever attached to said porous separating means which extends externally from said container and will cause said porous separating means to pivot upon pressure applied to said lever.

6. A bait container as described in claim 3 wherein said porous separating means comprises a screen mesh through which water is allowed to flow, but which prevents bait from flowing therethrough.

7. A bait container as described in claim 4 wherein said porous separating means comprises a screen mesh through which water is allowed to flow, but which prevents bait from flowing therethrough.

8. A bait container as described in claim 5 wherein said porous separating means comprises a screen mesh through which water is allowed to flow, but which prevents bait from flowing therethrough.

9. A bait container, comprising:
   a. a container means into which bait and water may be placed through an opening in an upper portion of said container, so as to contain said bait and said water within said container means; and
   b. a porous separating means located within said container which may be moved within said container and selectively positioned so as to separate an upper portion of said container from a lower portion of said container so as to trap bait within said upper portion for removal through said opening, wherein said porous separating means is selectively positioned by a lever attached to said porous separating means which extends externally from said container and will cause said porous separating means to pivot upon pressure applied to said lever.

10. A bait container as described in claim 9, wherein said porous separating means comprises a mesh through which water is allowed to flow, but which prevents bait from flowing there through.

* * * * *